United States Patent [19]

Ando et al.

[11] Patent Number: 5,073,879
[45] Date of Patent: Dec. 17, 1991

[54] INFORMATION PROCESSING APPARATUS USING A BEAM SPLITTING MEANS HAVING NON-POLARIZATION BEAM SPLIT SURFACE

[75] Inventors: Hideo Andō, Kawasaki; Yuichi Nakamura, Tokyo, both of Japan

[73] Assignee: Kabushiki Kaisha Toshiba, Kawasaki, Japan

[21] Appl. No.: 515,560

[22] Filed: Apr. 27, 1990

[30] Foreign Application Priority Data

Apr. 28, 1989 [JP] Japan .................................. 1-110107

[51] Int. Cl.$^5$ .................... G11B 11/12; G11B 7/14; G11B 13/04
[52] U.S. Cl. .................... 369/13; 369/110; 369/112
[58] Field of Search .................. 369/13, 110, 112, 116, 369/121; 360/114, 59; 350/375, 376, 401, 402, 403, 407

[56] References Cited

U.S. PATENT DOCUMENTS

| | | | |
|---|---|---|---|
| 4,502,783 | 3/1985 | Lau et al. | 350/401 |
| 4,588,263 | 5/1986 | Cohen et al. | 350/401 |
| 4,689,780 | 8/1987 | Ohara et al. | 369/112 |
| 4,712,203 | 12/1987 | Saito et al. | 360/114 |
| 4,721,368 | 1/1988 | Deguchi et al. | 369/110 |
| 4,773,060 | 9/1988 | Shimada et al. | 369/13 |
| 4,807,210 | 2/1989 | Kaku et al. | 369/109 |
| 4,905,215 | 2/1990 | Hattori et al. | 360/114 |
| 4,935,911 | 6/1990 | Ohuchida et al. | 360/114 |

*Primary Examiner*—Stuart S. Levy
*Assistant Examiner*—Hoa Nguyen
*Attorney, Agent, or Firm*—Finnegan, Henderson, Farabow, Garrett, and Dunner

[57] ABSTRACT

In an optical head, a light beam is emitted from a semiconductor laser which is rotatably supported and is guided to an optical disk through a beam splitter having a non-polarization beam split surface. The light beam reflected from the optical disk is reflected from the non-polarization beam split surface of the beam splitter, and directed to an photo-detector. The non-polarization beam split surface has reflectances which are determined so that $E(1-Rp)Rp/E(1-Rs)Rs$ falls within a range of $\frac{1}{2}$ to 2, where E is a ratio of an intensity of a light beam generated by said light source means to an intensity of a light beam returned to said non-polarization beam split surface, and Rs and Rp are reflectances with respect to the S and P polarized light components.

18 Claims, 5 Drawing Sheets

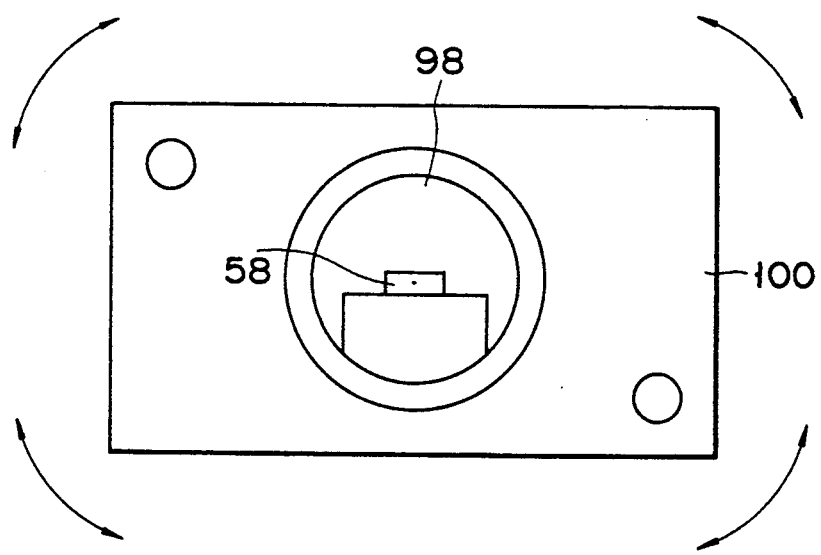
F I G. 2

INFORMATION PROCESSING APPARATUS USING A BEAM SPLITTING MEANS HAVING NON-POLARIZATION BEAM SPLIT SURFACE

BACKGROUND OF THE INVENTION

1. Field of the Invention

The present invention relates to an optical head for an information processing apparatus for optically recording information on an information recording medium and optically retrieving information from the information recording medium and, more particularly, to an improvement in an optical means for splitting an optical path in the optical head.

2. Description of the Related Art

An optical information recording/reproduction apparatus, e.g., an optical filing apparatus is assembled with an optical head for recording information on an optical information recording medium, i.e., an optical disk, and retrieving information therefrom. As an optical head of this type, an erasable opto-magnetic optical head, a write once type optical head, and the like are known. In the opto-magnetic optical head, recorded information is retrieved by a light beam radiated onto a recording surface of an optical disk by utilizing an opto-magnetic effect, and information is recorded and erased by the light beam. In the write once type optical head, a light beam is radiated on a recording surface of an optical disk, and recorded information is retrieved by modulating a light intensity of the reflected light beam or transmission light beam.

The optical head described above comprises a converging mean for converging a light beam emitted from a semiconductor laser as a light source on an information recording surface of an optical disk, a light beam splitting means for directing the light beam reflected by the optical disk toward a photosensor as a signal detection means, and a photosensor and a signal processing means for detecting the split beam and generating a retrieval signal of information, a focusing control signal, and a tracking control signal.

In the opto-magnetic optical head, a light beam emitted from a semiconductor laser is radiated onto an optical disk through a splitting means, i.e., a polarization beam split surface formed on a polarization prism, and the light beam reflected by the optical disk is reflected by the polarization beam split surface of the prism to be guided to a photosensor through a ½ wavelength plate. The ½ wavelength plate is arranged to define an angle of 22.5° between an axial direction of an ordinary or extraordinary ray passing through the ½ wavelength plate and a prism bottom surface. In an optical system in which the ½ wavelength plate is arranged to satisfy such a relationship, a rotary adjustment mechanism for rotating and adjusting the optical axis of the ½ wavelength plate around the system optical axis to assure stability of a retrieval signal is normally arranged in the opto-magnetic optical head.

In the write once type optical head, a light beam emitted from a laser beam is radiated on an optical disk through a polarization beam splitter formed on a prism, and a ¼ wavelength plate, and the light beam reflected by the optical disk passes through the ¼ wavelength plate again. The light beam is then reflected by a polarization beam split surface formed on the prism, and is then guided toward a photosensor.

In the above-mentioned optical heads, the ½ or ¼ wavelength plate is arranged, and the polarization beam split surface is formed on the prism to split a light beam reflected by the optical disk and to guide it toward the photosensor. The ½ and ¼ wavelength plates are expensive, and an optical system assembled with the ½ or ¼ wavelength plate becomes large in size.

In the opto-magnetic optical head, the ½ wavelength plate must be arranged to satisfy the predetermined positional relationship described above, and the adjustment mechanism therefor is arranged. When the ½ wavelength plate does not satisfy the predetermined positional relationship, the light intensities of P and S components detected by two detectors are unbalanced. In addition, an optical system becomes bulky due to the presence of the adjustment mechanism. When the ½ wavelength plate is fixed to the prism to attain a compact structure, its adjustment is cumbersome. If adjustment is unsuccessful, detected P and S components are unbalanced, and an S/N ratio of a retrieval signal may often be impaired. The unbalanced P and S components can be corrected by a correction circuit connected to the output side of the detectors. However, when a large correction amount is to be set, stability of the correction circuit is impaired.

In the write once type optical head, the polarization beam split split surface has a characteristic of allowing a specific polarized light component, e.g., a P component to pass through. When a semiconductor laser which generates a linearly polarized laser beam is arranged at a position rotated from a predetermined position about its optical axis, a plane of polarization of a laser beam incident on the polarization beam split surface is rotated, and a light intensity of a laser beam is changed. As a result, characteristics of optical heads of even the same type may vary. Mounting and adjustment operations of the semiconductor laser, and associated adjustments are cumbersome, resulting in a poor manufacturing yield of optical heads.

SUMMARY OF THE INVENTION

It is an object of the present invention to provide an optical head which can prevent a decrease in S/N ratio of a retrieval signal, can realize a compact structure and simple assembly/adjustment, and can stably detect a light beam.

According to the present invention, there is provided an optical head comprising:

a light source for generating a light beam;

converging means for converging the light source beam generated by the light source means on an information recording medium;

light beam splitting means arranged between the light source and the information recording medium, and having a non-polarization beam split surface for splitting a detection light beam reflected by the information recording medium from the light source beam propagating toward the information recording medium; and means for detecting the detection light beam split by the non-polarization beam split surface.

According to the optical head of the present invention, since the splitting means for splitting a light beam emitted from a semiconductor laser element adopts a non-polarization beam split beam surface, a light transmittance and a light reflectance can be rendered constant regardless of a direction of a plane of polarization of a light beam from the semiconductor laser element, and an S/N signal of, e.g., a retrieval signal can be improved. Therefore, an optical head in which a circuit system can be stabilized, and which has a compact and simple structure, and is easy to manufacture can be provided. Since neither ½ nor ¼ wavelength plates are required, an optical system can be simplified, and a low-cost optical head can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a plan view showing a holding mechanism of a semiconductor laser shown in FIG. 1;

DETAILED DESCRIPTION OF THE PREFERRED EMBODIMENTS

Figure 1:
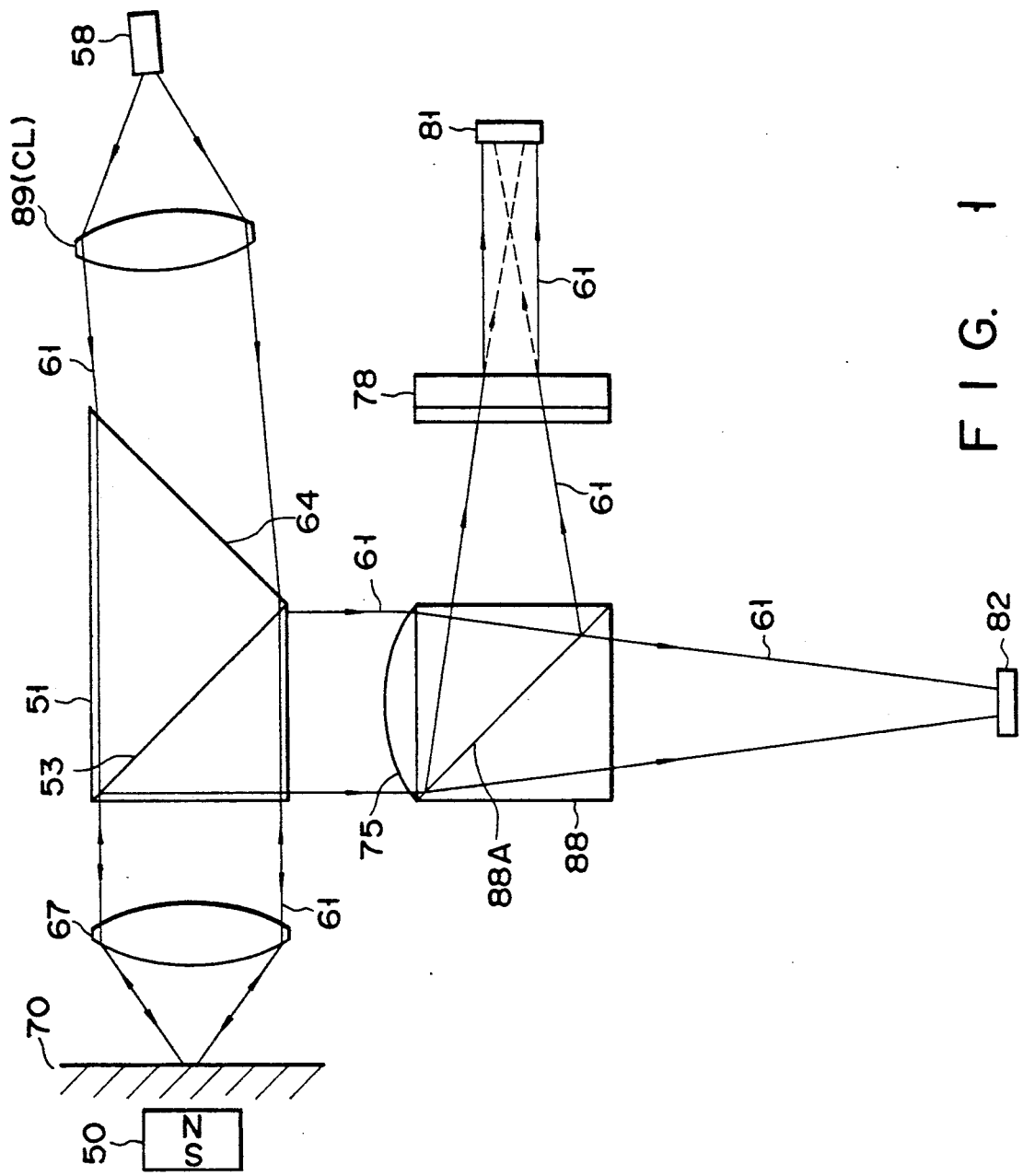
FIG. 1 is a schematic view of an opto-magnetic optical head according to an embodiment of the present invention.

FIG. 1 schematically shows an opto-magnetic head according to an embodiment of the present invention. As shown in FIG. 1, in the optical head of the present invention, a light beam 61 emitted from a semiconductor laser element 58 as a light source is diverged, and becomes incident on a collimator lens 89 to be collimated thereby. The collimated light beam 61 is elliptically corrected by an elliptic correction surface 64 of a prism 51, and then becomes incident on an objective lens 67 through a non-polarization beam split surface 53 of the prism 51.

A difference between the non-polarization beam split surface 53 and a polarization beam split surface will be explained below. The light beam 61 emitted from the semiconductor laser element 58 is a divergent light beam having a specific divergence angle, and the light beam has an elliptic section. The elliptic light beam 61 is linearly polarized in a minor axis direction of an elliptic plane in terms of its characteristics. A polarization beam split surface has a characteristic of allowing a linearly polarized light component of the light beam 61 to pass through, and reflecting other light beam components having different phases. More specifically, the polarization beam split surface allows a linearly polarized light component parallel to a plane of polarization of the polarization beam split surface, e.g., a P component to pass through, and reflects a linearly polarized light component perpendicular to the plane of polarization, e.g., an S component. Therefore, the polarization beam split surface allows a P wave to pass through but reflects most of an S wave. In contrast to this, the non-polarization beam split surface 53 has no polarization characteristics, and allows P and S components to pass therethrough at substantially the same intensities.

The light beam 61 which passes through the non-polarization beam split surface 53 and becomes incident on the objective lens 67 is converged by the objective lens 67 on an information recording medium, i.e., an optical disk 70 applied with a magnetic field from a magnet device 50. The divergent light beam 61 reflected by the optical disk 70 is converted to a collimated beam through the objective lens 67 again when the objective lens 67 is maintained in an in-focus state. In this in-focus state, a smallest beam spot is formed on the optical disk 70. The light beam 61 which is collimated through the objective lens 67 is reflected by the non-polarization beam split surface 53 of the prism 51, and becomes incident on and converged by a convex lens 75 fixed to a beam incident surface of a beam splitter 88. The convergent light beam 61 is split into two light beams by a split surface 88A of the beam splitter 88. One light beam 61 is reflected by the split surface 88A of the beam splitter 88, and is incident on a photosensor 81 through a cylindrical lens 78. The other light beam 61 passes through the beam splitter 88, and is incident on a photosensor 82. In this optical head, when no information is recorded in a region on the optical disk 70 searched by the light beam, the amounts of light beams incident on the two photosensors 81 and 82 become equal to each other, and the output signal levels of the photosensors 81 and 82 are also equal to each other.

In the optical head shown in FIG. 1, when the light beam 61 emitted from the semiconductor laser element 58 is attenuated by a light-transmission optical system extending to the information recording medium 70, the semiconductor laser is controlled by a control circuit (not shown) to increase the light intensity of the light beam 61 in order to stably record, retrieve, or erase information on or from the information recording medium 70. This control circuit can normally stably correct this attenuation within a range of 1 to 2 times. If transmittances and reflectances of the non-polarization beam split surface 53 with respect to S and P components are respectively represented by Ts, Tp, Rs, and Rp, a ratio of the transmittance Tp to the transmittance Ts normally falls within a range of 1:1 to 2:1, or a range up to 1:2. A ratio of the reflectance Rp to the reflectance Rs normally falls within a range of 1:1 to 2:1, or a range up to 1:2. More specifically, Ts/Tp falls within the range of ½ to 2, or Rs/Rp falls within the range of ½ to 2. Concerning the above-mentioned range in consideration of the fact that the service life of the semiconductor laser is seriously influenced when an emission intensity of the semiconductor laser 58 exceeds 1.5 times of a rated maximum light intensity, the non-polarization beam split surface 53 preferably has reflectances and transmittances which are determined so that the ratio of the transmittance Tp to the transmittance Ts falls within a range of 1:1 to 1:1.5 or a range up to 1:1.5, or the ratio of the reflectance Rp to the reflectance Rs falls within a range of 1:1.5 to 1.5:1 or a range up to 1:1.5. More specifically, the non-polarization beam split surface 53 preferably has reflectances and transmittances which are determined so that Ts/Tp falls within a range of 10/15 to 1.5 or Rs/Rp falls within the range of 10/15 to 1.5. (Although FIG. 1 shows a transmission type light transmission optical system in which a light beam emitted from the semiconductor laser 58 reaches the optical disk 70 without being reflected, a reflection type light transmission optical system in which a light beam emitted from the semiconductor laser 58 reaches the optical disk 70 after it is reflected is also taken into consideration.) In an optical system adopting the non-polarization beam split surface 53, even if the semiconductor laser element 58 is rotated from a predetermined position, stable retrieval, recording, or erasure of information will not be disturbed by the influence of rotation. In contrast to this, in an optical system having a polarization beam split surface which has a transmittance of 0% and a reflectance of 100% of an S component, when a plane of polarization of a light beam emitted from the semiconductor laser element 58 is rotated, its influence cannot be eliminated.

If the transmittances and reflectances of S and P components in FIG. 1 are respectively represented by Ts, Tp, Rs, and Rp, and if light absorption on the non-polarization beam split surface 53 is very small, we have:

$$Tp = 1 - Rp, \ Ts = 1 - Rs$$

When a laser beam emitted from the semiconductor laser element 58 is perfectly an S or P component, if a light intensity of a laser beam emitted from the semiconductor laser element 58 upon incidence on the non-polarization beam split surface 53 is given by 1, a light intensity detected by the photosensor 82 can be expressed by:

$$E \cdot Tp \cdot Rp = E(1-Rp)Rp, \ E \cdot Ts \cdot Rs = E(1-Rs)Rs$$

where E is the efficiency of a laser beam which is reflected by the information recording medium 70 and is returned through the objective lens 67 again. That is, E represents a ratio of an intensity of a light beam emitted from the semiconductor laser element 58 to an intensity of a light beam returned to the non-polarization beam splitter 51. Regarding the above-mentioned relations, the characteristics of the non-polarization beam split surface 53 and performances of the photosensors are determined.

The reflectances or transmittance of the non-polarization beam split surface 53 with respect to the P and S components in the optical system shown in FIG. 1 are not perfectly equal to each other, and may often have a small difference. In this case, as shown in FIG. 2, a package 98 of the semiconductor laser element 58 is held by a holder 100 to be rotatable about the optical axis of the laser element 58. The semiconductor laser element 58 is rotated about its optical axis to adjust the direction of its plane of polarization, so that the amounts of light beams 61 incident on the two photosensors 81 and 82 may be adjusted to be equal to each other. More specifically, when the non-polarization beam split surface 53 is an ideal one, since Rp=Rs, we have:

$$E(1-Rp)Rp = E(1-Rs)Rs$$

However, when the non-polarization beam split surface 53 has slightly different characteristics for the P and S components, Rp=Rs cannot be established, and the following relations are established:

$$E(1-Rp)Rp \neq 0$$

$$E(1-Rs)Rs \neq 0$$

In this case, the intensities of light beams incident on the two photosensors 81 and 82 can be adjusted to be equal to each other by rotating the holder 100.

In contrast to this, in a conventional optical system having a polarization beam split surface, for example, if Rs=1.0, $E(1-Rs)Rs=0$ is ideally satisfied. However, when mounting precision of a semiconductor laser is lowered, the intensities of light beams 61 incident on the photosensors 81 and 82 are changed from $E(1-Rp)Rp$ to $E(1-Rs)Rs$. When the light intensity is changed to a certain level, it can be corrected by gain adjustment in a detection signal retrieval circuit. However, when a change in light intensity exceeds a level twice the original intensity, an output becomes unstable if only correction of the detection signal retrieval circuit is performed. Therefore, the characteristics of the non-polarization beam split surface 53 must be set so that the ratio of $E(1-Rp)Rp:E(1-Rs)Rs$ falls within a range of 1:1 to 1:2 or a range up to 2:1. More specifically, $E(1-Rp)Rp/E(1-Rs)Rs$ is determined to fall within the range of ½ to 2. Preferably, this ratio must be set to fall within a range of 1:1 to 1:5 or a range up to 1.5:1. That is, $E(1-Rp)Rp/E(1-Rs)Rs$ is determined to fall within the range of 10/15 to 1.5.

When the light beam 61 is reflected by the non-polarization beam split surface 53, a phase shift occurs between the S and P waves, and linearly polarized light is converted to elliptically polarized light, thus degrading characteristics of a retrieval signal. In this case, according to calculation simulations of optical characteristics, a phase shift between the S and P waves when a light beam is reflected by the non-polarization beam split surface 53 must be equal to or smaller than 45°, preferably, equal to or smaller than 30°.

When a non-polarization beam split surface is used, an S/N ratio of a retrieval signal is decreased as compared to the prior art. However, according to the following calculations, the S/N ratio is decreased by only 1.55 dB as compared to the prior art, and is additionally decreased by only 1.25 dB when a phase shift occurs. Thus, it is demonstrated that no problem is posed.

Figure 3:
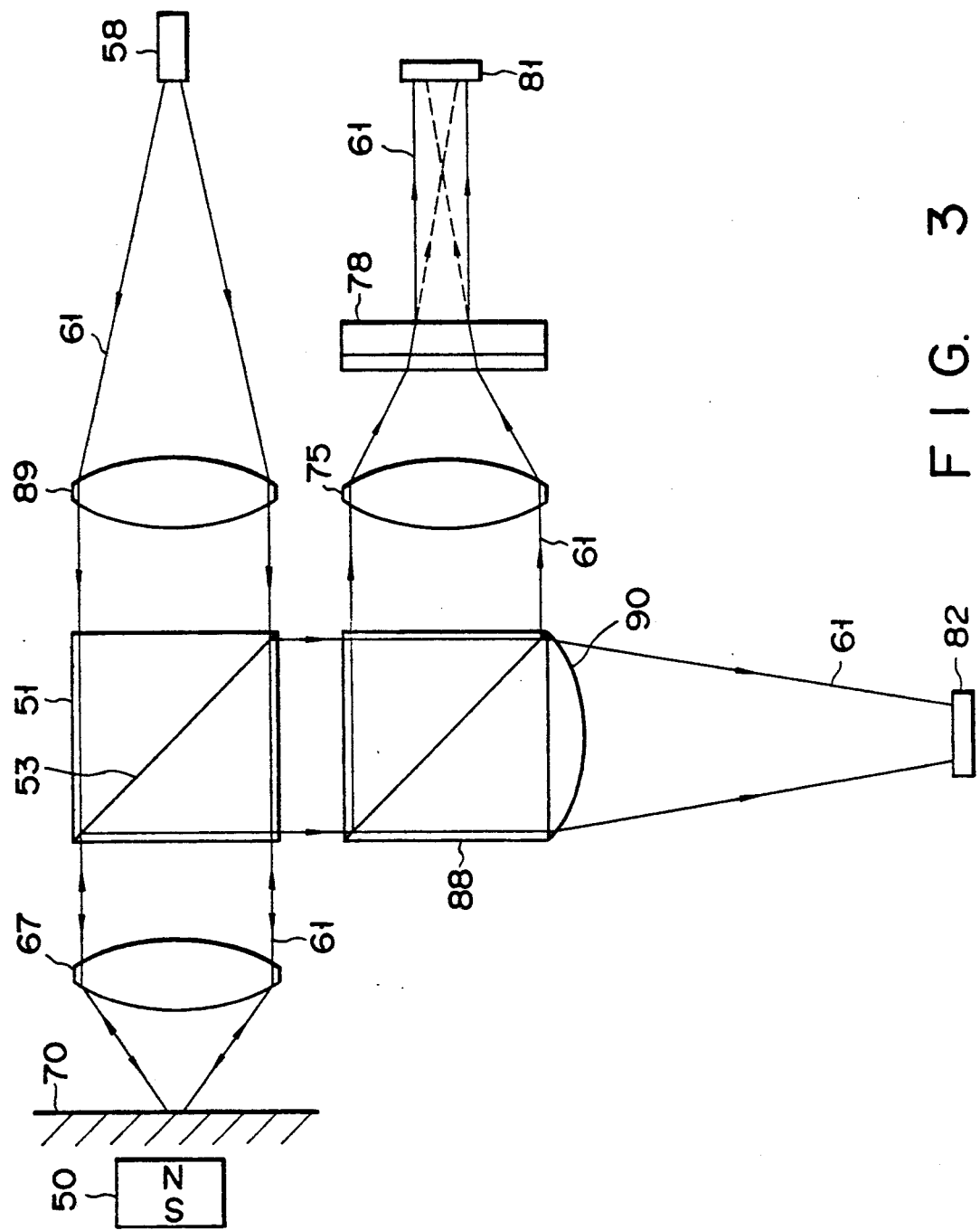
FIGS. 3 and 4 are schematic views showing applications of the opto-magnetic optical head shown in FIG. 1.
Figure 4:
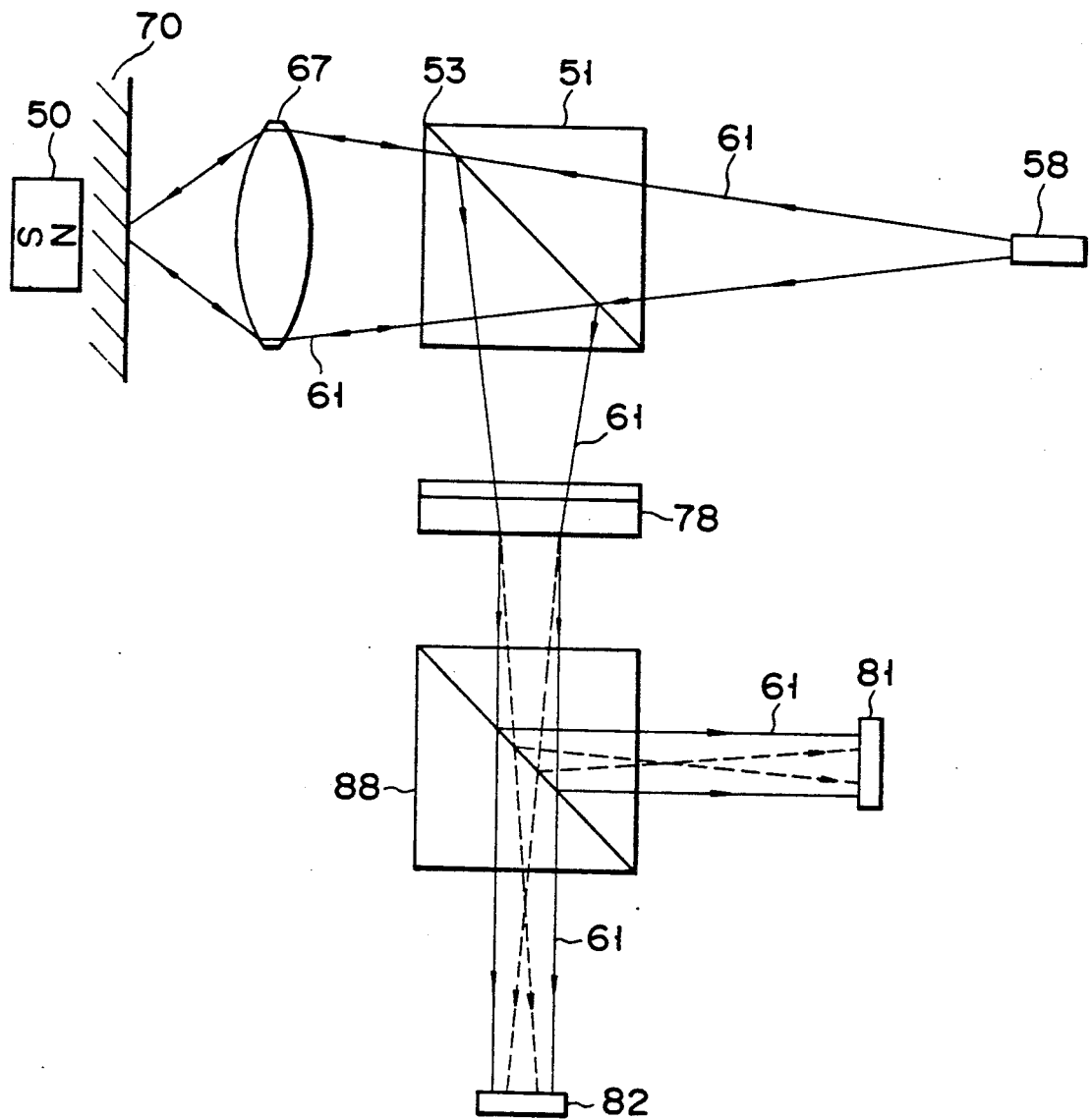

FIGS. 3 and 4 show applications of the embodiment of the present invention having a non-polarization beam splitter. In this embodiment, unlike in the optical system shown in FIG. 1, the prism 51 has no refraction surface for elliptical correction, and a laser beam from the semiconductor laser 58 is elliptically corrected by limiting an aperture of the objective lens. In optical heads for an opto-magnetic disk shown in FIGS. 3 and 4, the semiconductor laser element 58 is rotated so that a plane of polarization of the light beam which is reflected by and returned from the information recording medium 70 is incident on the polarization beam splitter 88 at an angle of about 45°, thus equalizing the intensities of light beams incident on the photosensors 81 and 82. Thus, a detection signal can be stably retrieved from a signal retrieval circuit.

Figure 5:
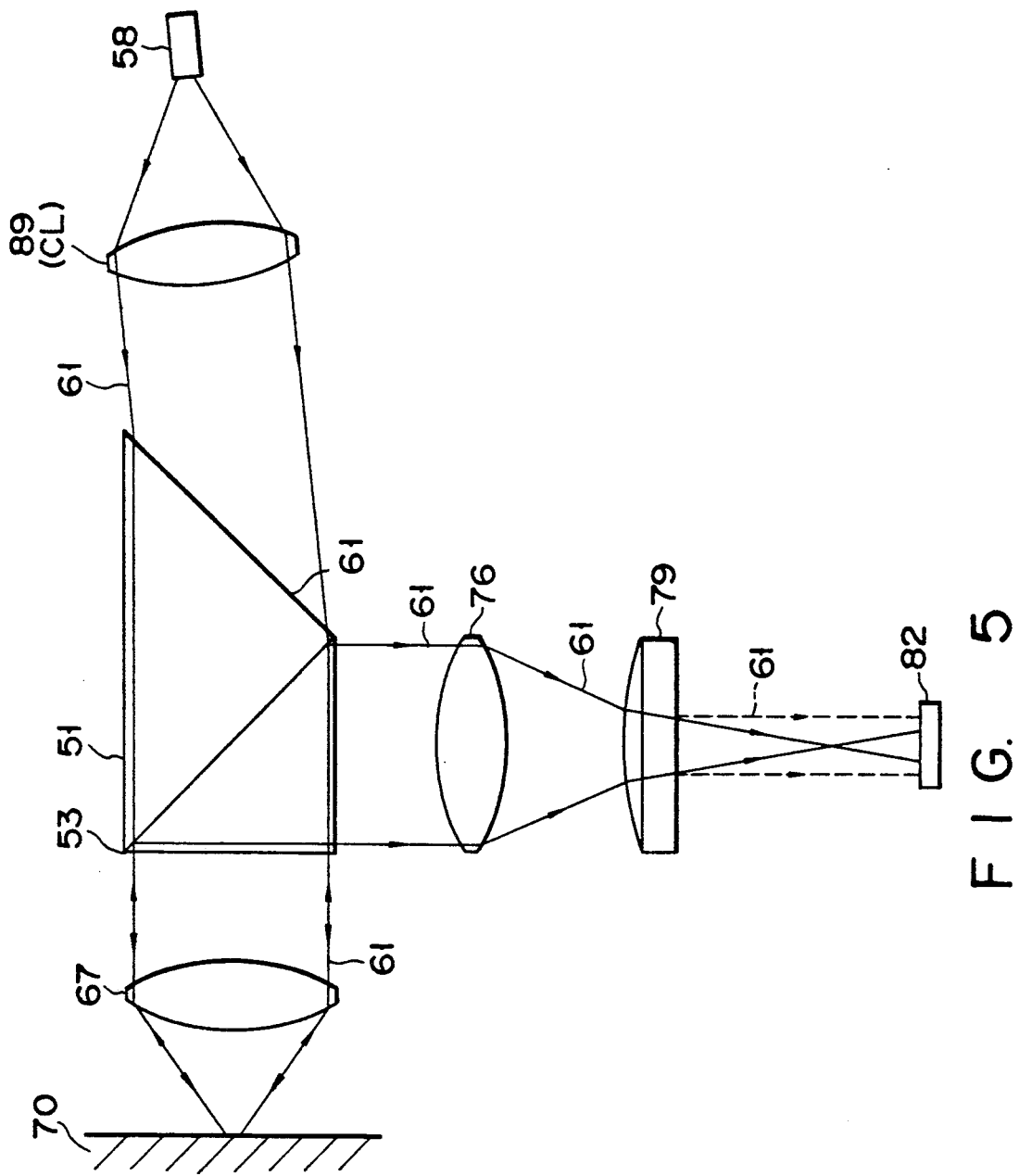
FIG. 5 is a schematic view of a write once type optical head according to another embodiment of the present invention.

FIG. 5 shows a write once type optical head according to another embodiment of the present invention. In the optical head shown in FIG. 5, an elliptically corrected laser beam passes through a non-polarization beam split surface 53, and is converged on an information recording medium 70 by an objective lens 67. The light beam reflected by the information recording medium 70 is reflected by the non-polarization beam split surface 53 through the object lens 67 again, and is converged by a condenser lens 76. The converged light beam is radiated on a photosensor 82 through an astigmatism lens, i.e., a cylindrical lens 79, and is then converted to a retrieval signal, a focusing signal, and a tracking signal by the next circuit (not shown). In an optical system shown in FIG. 5, no ¼ wavelength plate is arranged, and a linearly polarized light beam from the semiconductor laser element 58, e.g., an S component is transmitted through the non-polarization beam split surface 53 at a predetermined transmittance, and a polarized light beam from the information recording medium 70 is reflected by the non-polarization beam split surface 53 at a predetermined reflectance to be guided onto the photosensor 82.

In this optical system, unlike in a polarization beam split surface, the non-polarization beam split surface need not maintain the predetermined relationship with respect to a plane of polarization of a polarized light beam emitted from the semiconductor laser 58. Even if the semiconductor laser 58 is rotated from a predetermined position, the intensity of a light beam from the non-polarization beam split surface will not vary in units of optical heads. In addition, the structure of the optical system can be simplified, and cost of the optical system can be sufficiently suppressed.

According to the present invention, a compact, inexpensive optical head which can achieve stable signal detection can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An information processing apparatus comprising:
   means for generating a light beam;
   converging means for converging the light beam generated by said light beam generating means on an information recording medium;
   splitting means having a non-polarization beam split surface disposed between said light beam generating means and said information recording medium for splitting the light beam reflected from said information recording medium into split light beams having S and P polarized light components, the non-polarization beam split surface having reflectances Rs and Rp with respect to the S and P polarized components or transmittances Ts and Tp with respect to the S and P polarized components, wherein the ratio Ts/Tp falls within a range of ½ to 2 or the ratio Rs/Rp falls within a range of ½ to 2; and
   means for detecting one of the split light beams.

2. An information processing apparatus according to claim 1, further comprising:
   means for applying a magnetic field to said information recording medium for changing a magnetic state of a region on said information recording medium in accordance with the applied magnetic field said change of magnetic state changing reflectances from the region with respect to the S and P polarized light components and changing the ratio of the S polarized light components to the P polarized light components.

3. An information processing apparatus according to claim 1, wherein said light beam generating means includes a semiconductor laser.

4. An information processing apparatus according to claim 1, wherein said light beam generating means generates said light beam having an elliptical section, and said light beam splitting means includes means for converting the light beam having the elliptical section into a light beam having a circular section.

5. An information processing apparatus comprising:
   means for generating light beam;
   converging means for converging the light beam generated by said light beam generating means on an information recording medium;
   splitting means having a non-polarization beam split surface disposed between said light beam generating means and said information recording medium for splitting the light beam reflected from said information recording medium into split light beams having S and P polarized light components, the non-polarization beam split surface having reflectances Rp and Rs with respect to the S and P polarized components, wherein the reflectances Rs and Rp are determined so that $E(1-Rp)Rp/E(1-Rs)Rs$ falls within a range of ½ to 2, where E is a ratio of an intensity of a light beam generated by said light beam generating means to an intensity of a light beam returned to said non-polarization beam split surface from the information recording medium; and
   means for detecting one of the split light beams.

6. An information processing apparatus according to claim 5, further comprising:
   means for applying a magnetic field to said information recording medium for changing the magnetic state of a region on said information recording medium in accordance with the magnetic field said changing magnetic state being effected to change reflectances of the region with respect to the S and P polarized light components and change the ratio of the S polarized light components to the P polarized light components.

7. An information processing apparatus according to claim 5, wherein said light beam generating means includes a semiconductor laser.

8. An information processing apparatus according to claim 5, wherein said light beam generating means generates said light beam having an elliptical section, and said light beam splitting means includes means for converting the light beam having the elliptical section into a light beam having a circular section.

9. An information processing apparatus comprising:
   means, having an optical axis along which a light beam is directed toward a beam splitting means to an information recording medium, for generating a light beam along the optical axis, the light beam having a plane of polarization passing through the optical axis;
   means for rotating the light beam, to adjust the light beam along a direction of the polarization plane;
   converging means for converging the light beam generated by said light beam generating means on said information recording medium;
   said splitting means arranged between said light beam generating means and the information recording apparatus and having a non-polarization beam split surface, for splitting the light beam reflected from said information recording medium into split light beams which have S and P polarized light components, the non-polarization beam split surface having reflectances Rs and Rp or transmittances Ts and Tp with respect to the S and P polarized components; and mean for detecting one of the split light beams.

10. An information processing apparatus according to claim 9, further comprising:

means for applying a magnetic field to said information recording medium for changing a magnetic state of a region on said information recording medium in accordance with the magnetic field, the changed magnetic state changing reflectances of the region with respect to the S and P polarized light components and changing the ratio of the S polarized light components to the P polarized light components.

11. An information processing apparatus according to claim 9, wherein said light beam generating means includes a semiconductor laser.

12. An information processing apparatus according to claim 9, wherein said light beam generating means generates said light beam having an elliptical section, and said light beam splitting means includes means for converting the light beam having the elliptical section into a light beam having a circular section.

13. An information processing apparatus according to claim 9, wherein said non-polarization beam split surface has reflectances Rs and Rp or transmittances Ts and Tp with respect to the S and P polarized components, wherein the ratio of Ts/Tp falls within a range of $\frac{1}{2}$ to 2 or the ratio of Rs/Rp falls within a range of $\frac{1}{2}$ to 2.

14. An information processing apparatus according to claim 9, wherein said non-polarization beam split surface has reflectances Rs and Rp or transmittances Ts and Tp with respect to the S and P polarized components, wherein the ratio of Ts/Tp falls within a range of 10/15 to 1.5 or the ratio of Rs/Rp falls within a range of 10/15 to 1.5.

15. An information processing apparatus according to claim 9, wherein said non-polarization beam split surface has reflectances which are determined so that $E(1-Rp)Rp/E(1-Rs)Rs$ falls within a range of $\frac{1}{2}$ to 2, where E is a ratio of an intensity of a light beam generated by said light source means and an intensity of a light beam returned to said non-polarization beam split surface, and Rs and Rp are reflectances with respect to the S and P polarized light components.

16. An information processing apparatus according to claim 9, wherein said non-polarization beam split surface has reflectances which are determined so that $E(1-Rp)Rp/E(1-Rs)Rs$ falls within a range of 10/15 to 1.5, where E is a ratio of an intensity of a light beam generated by said light beam generating means to an intensity of a light beam returned to said non-polarization beam split surface, and Rs and Rp are reflectances with respect to the S and P polarized light components.

17. An information processing apparatus comprising:

means for generating a light beam;

converging means for converging the light beam generated by said light beam generating means on an information recording medium;

splitting means having a non-polarization beam split surface disposed between said light beam generating means and said information recording medium for splitting the light beam reflected from said information recording medium into split light beams having S and P polarized light components, the non-polarization beam split surface having reflectances Rs and Rp with respect to the S and P polarized components or transmittances Ts and Tp with respect to the S and P polarized components, wherein the ratio Ts/Tp falls within a range of 10/15 to 1.5 or the ratio Rs/Rp falls with a range of 10/15 to 1.5; and means for detecting one of the split light beams.

18. An information processing apparatus comprising:

means for generating a light beam;

converging means for converging the light beam generated by said light beam generating means on an information recording medium;

splitting means having a non-polarization beam split surface disposed between said light beam generating means and said information recording medium for splitting the light beam reflected from said information recording medium into split light beams having S and P polarized light components, the non-polarization beam split surface having reflectances Rp and Rs with respect to the S and P polarized components, wherein the reflectances Rs and Rp are determined so that $E(1-Rp)Rp/E(1-Rs)Rs$ falls within a range of 10/15 to 1.5, wherein E is a ratio of an intensity of a light beam generated by said light beam generating means to an intensity of a light beam returned to said non-polarization beam split surface from the information recording medium; and means for detecting one of the split light beams.

* * * * *